United States Patent [19]

George et al.

[11] Patent Number: 4,874,819

[45] Date of Patent: Oct. 17, 1989

[54] POLYMER BLEND

[75] Inventors: Eric R. George, Houston, Tex.; Robert G. Lutz, Santa Rosa, Calif.; Edgar J. Smutny, Houston, Tex.

[73] Assignee: Shell Oil Company, Houston, Tex.

[21] Appl. No.: 203,960

[22] Filed: Jun. 8, 1988

Related U.S. Application Data

[63] Continuation-in-part of Ser. No. 135,429, Dec. 21, 1987, abandoned.

[51] Int. Cl.$^4$ .................. C08L 23/00; C08L 33/02; C08L 101/06
[52] U.S. Cl. .................................... 525/185; 524/502
[58] Field of Search ........................ 525/185; 524/502

[56] References Cited

U.S. PATENT DOCUMENTS

| | | | |
|---|---|---|---|
| 2,495,286 | 1/1950 | Brubaker | 260/63 |
| 3,520,861 | 7/1970 | Thompson et al. | 260/88.1 |
| 3,694,412 | 9/1972 | Nozaki | 260/63 |
| 3,780,140 | 12/1973 | Hammer | 525/185 |
| 4,123,585 | 10/1978 | Sparzak et al. | 525/185 |
| 4,157,428 | 6/1979 | Hammer | 521/134 |
| 4,275,181 | 6/1981 | Hoh | 525/185 |
| 4,351,931 | 9/1982 | Armitage | 526/227 |
| 4,430,468 | 2/1984 | Schumachet | 524/451 |
| 4,489,193 | 12/1984 | Goswami | 525/185 |
| 4,600,614 | 7/1986 | Lancaster et al. | 428/35 |
| 4,601,948 | 7/1986 | Lancaster et al. | 428/349 |
| 4,678,713 | 7/1987 | Lancaster et al. | 428/421 |

FOREIGN PATENT DOCUMENTS

| | | |
|---|---|---|
| 0121965 | 10/1984 | European Pat. Off. . |
| 0181014 | 5/1986 | European Pat. Off. . |
| 229408 | 7/1987 | European Pat. Off. . |
| 9174622 | 3/1983 | Japan . |
| 1081304 | 8/1967 | United Kingdom . |
| 8607010 | 12/1986 | World Int. Prop. O. . |

*Primary Examiner*—Allan M. Lieberman
*Attorney, Agent, or Firm*—Dean F. Vance

[57] ABSTRACT

Improved melt stability without the loss of properties of strength and impact resistance are exhibited by blends of (a) linear alternating polymer of carbon monoxide and at least one ethylenically unsaturated hydrocarbon and (b) ethylene-$\alpha,\beta$-ethylenically unsaturated acid copolymer.

13 Claims, No Drawings

POLYMER BLEND

This is a continuation-in-part of application Ser. No. 135,429, filed Dec. 21, 1987, now abandoned.

FIELD OF THE INVENTION

This invention relates to improved polymer blends comprising a major proportion of a linear alternating polymer of carbon monoxide and at least one ethylenically unsaturated hydrocarbon. More particularly, the invention relates to blends of the linear alternating carbon monoxide polymer with ethylene-unsaturated carboxylic acid copolymer.

BACKGROUND OF THE INVENTION

The class of polymers of carbon monoxide and olefin(s) has been known for a number of years. Brubaker, U.S. Pat. No. 2,495,289 produced such polymers in the presence of free radical catalysts, e.g. peroxy compounds. U.K. Pat. No. 1,081,304 produced similar polymers of higher carbon monoxide content in the presence of alkylphosphine complexes of palladium salts as catalyst. Nozaki extended this process through the use of arylphosphine complexes of palladium and certain inert solvents, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of these polymers. The polymers, often referred to as polyketones or polyketone polymers, have been shown to be of a structure of the repeating formula —CO(A) where A is the moiety of the ethylenically unsaturated hydrocarbon polymerized through the ethylenic unsaturation. For example, when the ethylenically unsaturated hydrocarbon is ethylene, the polymer is represented by the repeating formula —CO(CH$_2$-CH$_2$). The general process for the production of such polymers is illustrated by a number of published European Patent applications including 0,121,965 and 0,181,014. The process generally involves a catalyst composition formed from a compound of the Group VIII metals palladium, cobalt or nickel, the anion of a non-hydrohalogenic acid having a pKa below 2 and a bidentate ligand of phosphorus, arsenic or antimony.

The resulting polymers are relatively high molecular weight thermoplastics having utility in the production of shaped articles such as containers for food and drink and shaped parts for the automotive industry. For some particular applications it has been found desirable to have properties of a polymeric composition which are somewhat different from those of the polyketone polymer. It would be of advantage to retain the desirable properties of the polyketone and yet improve other properties. These advantages are often obtained through the provision of a polymer blend.

SUMMARY OF THE INVENTION

This invention contemplates the provision of blends of linear alternating polymers of carbon monoxide and at least one ethylenically unsaturated hydrocarbon with other polymeric materials. More particularly, there is provided according to the invention a blend of the linear alternating polymer with ethylene-unsaturated carboxylic acid copolymers, which blend demonstrates improved melt stability without the loss of desirable properties of strength and impact resistance.

DESCRIPTION OF THE INVENTION

The polyketone polymers which are employed in the blends of the invention are linear alternating polymers of carbon monoxide and at least one ethylenically unsaturated hydrocarbon. Suitable ethylenically unsaturated hydrocarbons for use as precursors of the polyketones have from 2 to 20 carbon atoms inclusive, preferably up to 10 carbon atoms, and are aliphatic such as ethylene and other α-olefins, including propylene, 1-butene, 1-octane and 1-docecene, or are arylaliphatic containing an aryl substituent on an otherwise aliphatic molecule, preferably an aryl substituent on a carbon atom of the ethylenic unsaturation. Illustrative of this later class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second hydrocarbon of at least three carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of hydrocarbon. When terpolymers of carbon monoxide, ethylene and a second ethylenically unsaturated hydrocarbon are employed in the blends of the invention there will be at least two units incorporating a moiety of ethylene for each unit employing a moiety of the second hydrocarbon. Preferably, there will be from about 10 to about 100 units employing a moiety of ethylene per unit incorporating a moiety of the second hydrocarbon. The polymer chain is therefore illustrated by the formula

Where B is the moiety obtained by polymerization of the second hydrocarbon through the ethylenic unsaturation. The —CO(CH$_2$-CH$_2$) units and the —CO(B) units are found randomly throughout the polymer chain and ratio of y:x is no more than about 0.5. In the modification of the invention where copolymers of carbon monoxide and ethylene are employed, the second hydrocarbon is not present in the polyketone polymer chain and the polymers were represented by the above formula wherein y=0. When y is other than 0, as in the case of terpolymers, ratios of y:x from about 0.1 to about 0.1 are preferred. The end groups or "caps" of the polymer chain will depend upon what materials are present during the production of the polymer and whether and how the polymer has been purified. The precise nature of the end groups is of little significance with regard to the overall properties of the polymer so that the polyketone polymer is fairly represented by the above formula. Of particular interest are the polymers of molecular weight from about 1,000 to about 200,000, particularly those of molecular weight from about 10,000 to about 50,000 containing substantially equimolar quantities of carbon monoxide and unsaturated hydrocarbon. The physical properties of such polymers depend in part on the molecular weight of the polymer, whether the polymer is a copolymer or a terpolymer and the relative proportion of any second hydrocarbon present in the case of terpolymers. Typical melting points of such polymers are from about 175° C. to about 300° C., more frequently from about 210° C. to about 270° C.

A method of producing polyketone polymers which is now becoming conventional is to contact the carbon monoxide and hydrocarbon(s) with a catalyst composition formed from a palladium compound, a non-hydrohalogenic acid having a pKa below about 6 and a bidentate ligand of defined structure. Such a process for polyketone production is illustrated by copending U.S. patent application, Ser. No. 930,468 filed November 14, 1986. The scope of the process for the production of the polyketone polymers is substantial. Without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is selected from 1,3-bis(diphenylphosphino)propane or 1,3-bis[di(2-methoxyphenyl)phosphino]propane.

Polymerization is conducted under polymerization conditions in the gaseous phase or in a liquid phase in the presence of a reaction diluent such as a lower alkanol, e.g, methanol or ethanol. The reactants and catalyst are contacted by conventional means as by shaking or stirring. Suitable reaction temperatures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polyketone polymer may contain residues of the catalyst which are removed, if desired, by treatment of the polymer with a solvent which is selective for the residues.

The ethylene-unsaturated acid copolymers which are blended with the polyketone according to the invention are copolymers of ethylene and $\alpha,\beta$-ethylenically unsaturated carboxylic acids. Although a variety of $\alpha,\beta$-ethylenically unsaturated carboxylic acids of up to 10 carbon atoms, or in some cases more, are useful as a component of the ethylene copolymers, e.g., 2-hexanoic acid, 2-octenoic acid and 2-decenoic acid, the preferred unsaturated acids are those of up to 4 carbon atoms which are acrylic acid, methacrylic acid and crotonic acid. Acrylic acid is a particularly preferred component of the ethylene-unsaturated acid copolymer.

The ethylene-unsaturated acid copolymers are those copolymers having a relatively large proportion of ethylene and a relatively small proportion of the unsaturated acid. Typical ethylene copolymers are from about 0.1% by weight to about 35% by weight based on total copolymer of the $\alpha,\beta$-ethylenically unsaturated carboxylic acid. The copolymers preferably have from about 1% by weight to about 20% by weight based on total copolymer of the unsaturated acid.

The method by which the copolymers are produced is not material and ethylene-unsaturated acid copolymers produced by a variety of methods are useful in the blends of the invention. A number of ethylene-acrylic acid copolymers and ethylene-methacrylic acid copolymers are commercially available. A general discussion of the production of ethylene-unsaturated acid copolymers is found in Thompson et al, U.S. 3,520,861 and Armitage, U.S. Pat. No. 4,351,931, incorporated herein by reference. A particularly useful class of ethylene-acrylic acid copolymers is marketed by Dow Chemical Company under the tradename PRIMACOR and a useful class of ethylene-methacrylic acid copolymers is marketed by DuPont Co. under the tradename NUCREL.

The blends of the invention are predominantly polyketone with a lesser quantity of the ethylene-unsaturated acid copolymer. The precise percentage of the ethylene-unsaturated acid copolymer to be employed is not critical and blends containing as low as 0.01% are satisfactory. Percentages from about 0.1% by weight to about 35% by weight of the ethylene-unsaturated acid copolymer, based on the total blend, are generally preferred. Better results are obtained through the use of from about 0.5% by weight to about 10% by weight, more preferred 1% by weight to about 7% by weight, of the ethylene-unsaturated acid copolymer, based on total blend.

The method of producing the blend of polyketone and polycarbonate is not material so long as an intimate blend of the two components is produced without undue degradation of the blend or its components. A particularly useful procedure is to intimately mix the polymers in the form of granules and/or powder in a high shear mixer. "Intimately mixing" means to mix the polymers with sufficient mechanical shear and thermal energy to ensure that the components will not delaminate on processing. Intimate mixing is typically achieved by employing high shear extrusion compounding machines such as twin screw compounding extruders and thermoplastic extruders.

The blends of the invention may also include conventional additives such as antioxidants and stabilizers, fillers and fire retardant materials, mold release agents and other materials designed to increase the processability of the polymer or the properties of the resulting blend. Such additives are added by conventional methods prior to, together with or subsequent to the blending of the polyketone and the ethylene-unsaturated acid copolymer.

The polyketone polymer/ethylene-unsaturated acid copolymer blends of the invention are non-miscible blends having properties improved over those of the polyketone polymer or those of the ethylene-unsaturated acid copolymer. The ethylene-unsaturated acid copolymer exists as a discrete phase in the polyketone matrix. The blends show an improved melt stability without the loss of desirable properties of strength and impact resistance. The blends are of particular utility in instances where molded parts are desired which require strength when exposed to conditions of elevated temperature. The blends can be processed by means of the usual techniques, such as injection molding, into, among other things sheets, plates and molded objects. Illustrative of such applications are the production of internal as well as external parts for automotive applications and structured parts for application in the construction industry.

The invention is further illustrated by the following Illustrative Embodiments which should not be construed as limiting the invention.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the terpolymer was 220° C. and the polymer had a limiting viscosity number (LVN) of 1.75 (measured at 60° C. in m-cresol).

ILLUSTRATIVE EMBODIMENT II

A blend of the terpolymer of Illustrative Embodiment I and 5% by weight, based on total blend of PRIMACOR 1430 Polymer, an ethyleneacrylic acid copolymer marketed by Dow Chemical Company, was prepared in a Haake extruder. PRIMACOR 1430 Polymer contains 9-10% by weight acrylic acid with the remainder being ethylene. The resulting blend had a uniform appearance and a Melt Index of 5. The extrudability of the blend was termed excellent. The extruded blend was injection molded to produce standard test specimens. The blend exhibited enhanced injection moldability in comparison to the neat terpolymer. Electron micrographs from the molded articles indicated that the ethylene-acrylic acid copolymer was present as a discrete phase with a phase size diameter of 0.5 to 1.0 micron. This infers good interfacial adhesion between the dispersed ethylene-acrylic acid copolymer phase and the polyketone matrix.

ILLUSTRATIVE EMBODIMENT III

Blends of PRIMACOR 1430 were Polymer prepared by the procedure of Illustrative Embodiment II with polyketone terpolymers produced by the general procedure of Illustrative Embodiment I. Physical properties of these blends were measured and the results are shown in Table I.

TABLE 1

| % PRIMACOR 1430 in blend by wt. | Flex Modulus (psi) | Flex Strength (psi) | Notched Izod, room temp, ft. lb./in. |
|---|---|---|---|
| 0 | 206,000 | 7,200 | 4.2 |
| 5 | 212,000 | 7,500 | 5.3 |
| 10 | 188,000 | 6,600 | 4.3 |

ILLUSTRATIVE EMBODIMENT IV

Measurements of melting points and crystallization temperatures, or alternatively heats of melting and heats of fusion, for the blend of Illustrative Embodiment II were made by the use of a Perkin-Elmer DSC 7 differential scanning calorimeter (DSC) which employs samples of polymer or polymer composition in sealed pan containers. The pan and contents are heated at a controlled rate, typically 20° C./minute, until the same has melted. The pan and contents are then cooled until the sample has solidified and then heated, past a second melting point, to 285° C. at which temperature the sample is maintained for 10 minutes. The pan and contents are then cooled until the sample has solidified a second time. The melting and crystallization temperatures are defined as the temperatures at which the heat flow reaches a maximum (for melting) or a minimum (for crystallization). Typically the melting point, $T_m$, will be higher than the crystallization temperature, $T_c$. Although a number factors influence the melting point and crystallization temperature, these values are also influenced by the crystallinity of the polymer. In general, the smaller the difference between the first and second melting points, the greater the degree of retained crystallinity. The same relationship is generally true for the crystallization temperatures. The higher the degree of retained crystallinity the better the melt stability of the composition.

It is also possible to determine through the use of the DSC the magnitude of the first and second heats of melting ($H_1$ and $H_2$) and the first and second heats of crystallization ($C_1$ and $C_2$) for the polymer blend. In general, the heats of crystallization for the blend will be higher than the corresponding values for the neat terpolymer. The greater the difference is, the greater the degree of crystallinity which has been retained in the blend.

A blend of the terpolymer of Illustrative Embodiment I and 10% by weight based on total blend of Primacor 1430 Polymer was prepared in a Haake extruder and a sample of the blend was evaluated in the DSC. A sample of the terpolymer prepared in Illustrative Embodiment I was evaluated in the DSC as a standard. The results of the DSC measurements are shown in Table 2. In Table 2, temperatures are measured in °C. and heats are measured in cal/g.

TABLE 2

| Sample | $Tm_1$ | $Tc_1$ | $Tm_2$ | $Tc_2$ | $C_1$ | $C_2$ | $H_1$ | $H_2$ |
|---|---|---|---|---|---|---|---|---|
| Standard | 228 | 171 | 219 | 158 | 17.9 | 15.4 | 20.5 | 21.9 |
| Blend[a] | 224 | 175 | 217 | 160 | 18.3 | 15.3 | 20.1 | 22.8 |

[a]10% by weight Primacor 1430 based on total weight of terpolymer and Primacor blend.

ILLUSTRATIVE EMBODIMENT V

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the terpolymer was 220° C. and the polymer had a limiting viscosity number (LVN) of 1.96 (measured at 60° C. in m-cresol).

ILLUSTRATIVE EMBODIMENT VI

Blends of the terpolymer of Illustrative Embodiment V and two different ethylene-acrylic acid copolymers, marketed by DuPont Company, were separately prepared in a 15mm twin screw Baker Perkins extruder. The ethylene-acrylic acid copolymers contain 6% and 20% by weight acrylic acid with the remainder being ethylene. Measurements of melting points and crystallization temperatures, or alternatively heats of melting and heats of fusion, for the blends were made according to the procedure of Illustrative Embodiment IV. A sample of the terpolymer prepared in Illustrative Embodiment V was evaluated in the DSC as a standard. The results of the DSC measurements are shown in Table 3. Samples A, B and C were prepared with the ethylene-acrylic acid copolymer containing 6% by weight acrylic acid. Samples D, E and F were prepared with the ethylene-acrylic acid copolymer containing 20% by weight acrylic acid. In Table 3, the temperatures are measured in °C. and heats are measured in cal/g.

TABLE 3

| Sample | % copolymer[a] | $Tm_1$ | $Tc_1$ | $Tm_2$ | $Tc_2$ | $C_1$ | $C_2$ | $H_1$ | $H_2$ |
|---|---|---|---|---|---|---|---|---|---|
| Standard | 0 | 223 | 172 | 216 | 158 | 16.1 | 13.9 | 18.0 | 18.7 |
| A | 0.1 | 225 | 170 | 222 | 161 | 17.5 | 15.1 | 18.8 | 18.6 |
| B | 1.0 | 230 | 175 | 221 | 168 | 17.6 | 15.6 | 18.8 | 17.9 |

TABLE 3-continued

| Sample | % copolymer[a] | $Tm_1$ | $Tc_1$ | $Tm_2$ | $Tc_2$ | $C_1$ | $C_2$ | $H_1$ | $H_2$ |
|---|---|---|---|---|---|---|---|---|---|
| C | 5.0 | 221 | 175 | 213 | 158 | 14.2 | 12.3 | 16.9 | 15.0 |
| D | 0.1 | 219 | 170 | 218 | 160 | 17.4 | 14.9 | 19.1 | 19.5 |
| E | 1.0 | 222 | 171 | 219 | 165 | 17.6 | 16.1 | 18.1 | 18.5 |
| F | 5.0 | 220 | 170 | 219 | 164 | 16.1 | 14.9 | 17.1 | 16.9 |

[a] % by weight ethylene-acrylic acid copolymer based on total weight of blend.

ILLUSTRATIVE EMBODIMENT VII

Blends of the terpolymer of Illustrative Embodiment V and Nucrel 535 Polymer; an ethylene-methacrylic acid copolymer marketed by DuPont Company, were prepared in a 15mm twin screw Baker Perkins extruder. Nucrel 535 Polymer contains 10% by weight methacrylic acid with the remainder being ethylene. Measurements of melting points and crystallization temperatures, or alternatively heats of melting and heats of fusion, for the blends were made according to the procedure of Illustrative Embodiment IV. A sample of the terpolymer of Illustrative Embodiment V was evaluated in the DSC as a standard. The results of the DSC measurements are shown in Table 4. In Table 4, the temperatures are measured in °C. and heats are measured in cal/g.

TABLE 4

| Sample | % copolymer[a] | $Tm_1$ | $Tc_1$ | $Tm_2$ | $Tc_2$ | $C_1$ | $C_2$ | $H_1$ | $H_2$ |
|---|---|---|---|---|---|---|---|---|---|
| Standard | 0 | 223 | 172 | 216 | 158 | 16.1 | 13.9 | 18.0 | 18.7 |
| G | 0.1 | 227 | 171 | 226 | 158 | 16.6 | 14.1 | 20.2 | 18.7 |
| H | 1.0 | 224 | 170 | 218 | 155 | 16.9 | 13.8 | 19.2 | 19.7 |
| I | 5.0 | 224 | 170 | 222 | 157 | 16.3 | 13.7 | 17.2 | 19.0 |

[a] % by weight ethylene-methacrylic acid copolymer based on total weight of blend.

ILLUSTRATIVE EMBODIMENT VIII

When a linear alternating polymer of carbon monoxide and ethylene is blended with 5% of an ethylene-methacrylic acid copolymer, improved melt stability without the loss of strength and impact resistance, as compared with the unblended polymer, will be observed.

What is claimed is:

1. A composition comprising a non-miscible blend of a linear alternating polymer of carbon monoxide and at least one ethylenically unsaturated hydrocarbon of from 2 to 20 carbon atoms inclusive and an ethylene-$\alpha,\beta$-ethylenically unsaturated carboxylic acid copolymer, said $\alpha,\beta$-ethylenically unsaturated carboxylic acid having up to 10 carbon atoms, wherein the amount of said ethylene-$\alpha,\beta$-ethylenically unsaturated carboxylic acid copolymer is 0.01% to 35% by weight based on the total blend.

2. The composition of claim 1 wherein the linear alternating polymer is represented by the formula

wherein B is the moiety of an ethylenically unsaturated hydrocarbon of at least three carbon atoms and the ratio of y:x is no more than 0.5.

3. The composition of claim 2 wherein the $\alpha,\beta$-unsaturated carboxylic acid has up to 4 carbon atoms and the copolymer is present in an amount from about 0.1% to about 35% by weight based on the total blend.

4. The composition of claim 3 wherein B is the moiety of propylene.

5. The composition of claim 4 wherein the $\alpha,\beta$-unsaturated carboxylic acid is acrylic acid present in the copolymer in an amount from about 0.1% by weight to about 35% by weight based on total copolymer.

6. The composition of claim 4 wherein the $\alpha,\beta$-unsaturated carboxylic acid is methacrylic acid present in the copolymer in an amount from about 0.1% to about 35% by weight based on total copolymer.

7. The composition of claim 3 wherein y=0.

8. The composition of claim 7 wherein the $\alpha,\beta$-unsaturated carboxylic acid is methacrylic acid.

9. The composition of claim 7 wherein the $\alpha,\beta$-unsaturated carboxylic acid is acrylic acid.

10. The composition of claim 1 wherein said copolymer is present in an amount of from about 0.5 to about 10% by weight based on the total blend.

11. The composition of claim 10 wherein said copolymer is present in an amount of from 1% to about 7% by weight based on the total blend.

12. The composition of claim 1 wherein said $\alpha,\beta$-unsaturated carboxylic acid is present in said copolymer in an amount from about 0.1% to about 35% by weight based on the total copolymer.

13. The composition of claim 12 wherein said $\alpha,\beta$-unsaturated carboxylic acid is present in said copolymer in an amount from about 1% to about 20% by weight based on the total copolymer.

* * * * *